(No Model.)
C. R. WELDE.
BELT FASTENER.
No. 432,104. Patented July 15, 1890.
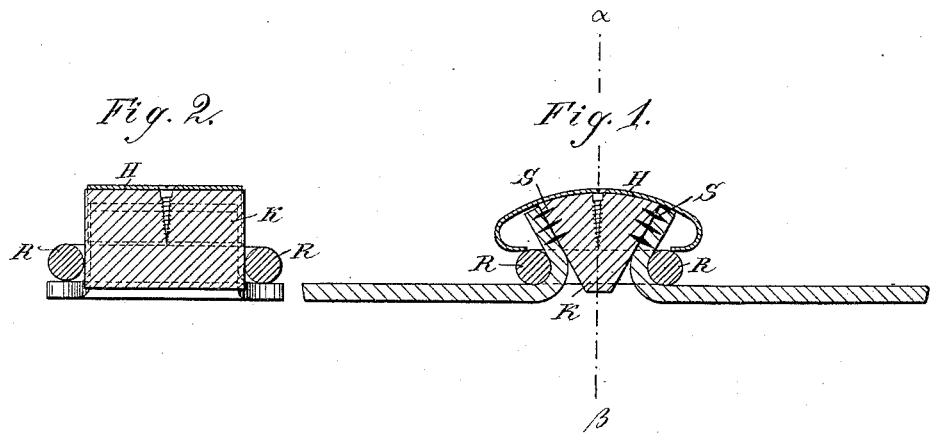
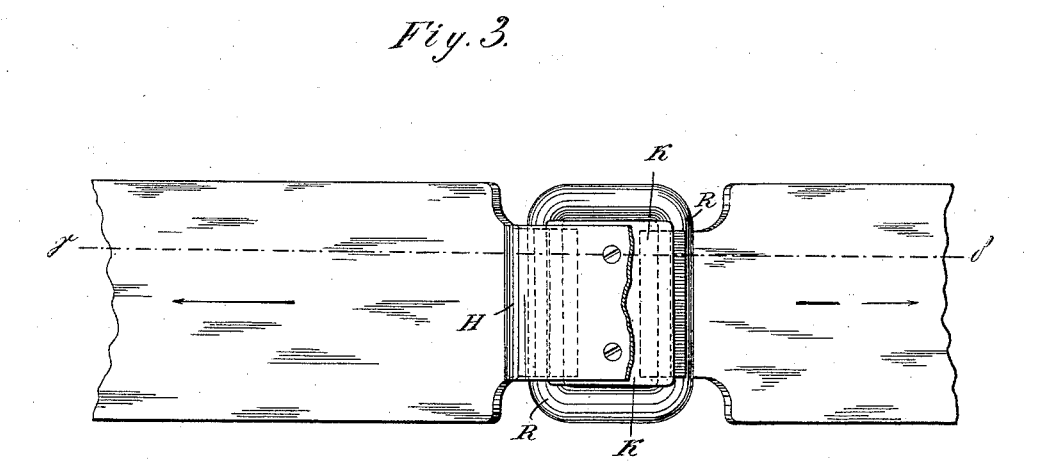
Witnesses:
Hugo Summers
B. Käsner
Inventor:
Carl Rob. Welde
by: Church & Church
attorneys

UNITED STATES PATENT OFFICE.

CARL ROBERT WELDE, OF KÖNIGSTEIN-ON-THE-ELBE, GERMANY.

BELT-FASTENER.

SPECIFICATION forming part of Letters Patent No. 432,104, dated July 15, 1890.

Application filed March 19, 1890. Serial No. 344,533. (No model.)

*To all whom it may concern:*

Be it known that I, CARL ROBERT WELDE, a subject of the Emperor of Germany, residing at Königstein-on-the-Elbe, in Germany, have invented certain new and useful Improvements in and relating to Belt, Strap, or Band Fasteners, (for which I have applied for Letters Patent of Great Britain, No. 3,357, dated March 3, 1890,) of which the following is a specification.

The object of this invention is to enable the ends of driving belts or bands and the like to be connected in a rapid, easy, and secure manner without making any holes in the strap or damaging the same in any way, and so that the disconnection of the belts may also be effected readily, which, it will be remembered, is sometimes necessary—for instance, when the belt is stretched and requires tightening or shortening.

In the accompanying drawings, Figure 1 is a longitudinal section of two strap ends connected by this improved device. Fig. 2 is a cross-section, and Fig. 3 a top view.

The connecting device consists of a rectangular ring or link R, made of the desired strength and closed on all sides, and of a three-sided prismatic wedge K, made preferably of wood, the two contact-surfaces of which are provided with fastening-pins S, and to the third—*i. e.*, external—face of which a spring-clamp H is to be secured.

The mode of application and operation of this belt-connecting device will be readily understood from inspection of the drawings. A ring or link R is passed over both the strap ends to be connected, after which they are bent outwardly in opposite directions, as shown. A wedge K is then inserted between them, the fastening-pins thereon are driven into the leather of the belt, and, lastly, the elastic protecting-plate is screwed over the whole, thus completing the fastening.

The advantages derived from this arrangement may be summed up as follows: The connecting operation is most simple and can be performed by any workman in a minimum of time. The strap or belt may be stretched to the utmost extent without any risk of the fastening coming undone. The belt is efficiently protected from damage. It may be readily unfastened in case of stretching. The repairing of belts by means of rivets, screws, &c., or by switching is practically avoided, and inasmuch as the belt-ends do not overlap, swellings and consequent interruptions of adhesion or friction between the belt and the pulley, &c., are prevented, while uniform elasticity and smooth noiseless operation are insured.

I claim—

An improved device for connecting the ends of driving-belts, straps, and the like, consisting of a rectangular ring or link R closed on all sides, a wedge K, adapted to be interposed between the projecting ends of the belt and provided with suitable fastening-pins, and a clamp or plate H screwed over the whole and protecting the fastening by spring action.

In testimony whereof I have hereto set my hand in the presence of the two subscribing witnesses.

CARL ROB. WELDE.

Witnesses:
 R. RÄSSNEY,
 PAUL DRUCKMÜLLER.